(12) United States Patent
Ishikawa et al.

(10) Patent No.: US 9,987,756 B2
(45) Date of Patent: Jun. 5, 2018

(54) HAND DEVICE, ROBOT ARM, AND ROBOT (71) Applicant: HONDA MOTOR CO., LTD., Tokyo (JP)

(72) Inventors: Tetsuya Ishikawa, Saitama (JP); Susumu Miyazaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 177 days.

(21) Appl. No.: 15/042,385

(22) Filed: Feb. 12, 2016

(65) Prior Publication Data
US 2016/0236354 A1 Aug. 18, 2016

(30) Foreign Application Priority Data

Feb. 17, 2015 (JP) ................. 2015-028968

(51) Int. Cl.
*B66C 1/00* (2006.01)
*B25J 19/00* (2006.01)
*B25J 15/02* (2006.01)

(52) U.S. Cl.
CPC ....... *B25J 19/0091* (2013.01); *B25J 15/0206* (2013.01)

(58) Field of Classification Search
CPC .. B25J 19/0091; B25J 15/0206; B25J 19/063; B25J 19/06; B25J 17/02; B25J 15/0213; B25J 9/0006; B25J 18/00
USPC ................. 294/104, 106; 901/1, 15, 31, 38; 414/732, 738
See application file for complete search history.

(56) References Cited

U.S. PATENT DOCUMENTS

| | | | | | |
|---|---|---|---|---|---|
| 3,013,835 A | * | 12/1961 | Blatt | ............. | B25J 15/0206 164/404 |
| 3,425,734 A | * | 2/1969 | Hollis | ............. | A45B 3/00 294/104 |
| 3,620,095 A | * | 11/1971 | Dane | ............. | B25J 13/082 294/111 |
| 4,473,249 A | * | 9/1984 | Valentine | ............. | B25J 9/144 294/104 |
| 4,681,213 A | * | 7/1987 | Winiasz | ............. | B65H 29/003 198/803.9 |
| 5,108,140 A | * | 4/1992 | Bartholet | ............. | B25J 15/0009 294/106 |
| 5,374,093 A | * | 12/1994 | Klopfenstein | ............. | B65H 29/003 271/204 |
| 6,010,536 A | * | 1/2000 | Veatch | ............. | A61F 2/588 414/6 |
| 7,500,702 B2 | * | 3/2009 | Son | ............. | B62D 65/14 294/192 |
| 7,950,710 B2 | * | 5/2011 | Matsukuma | ............. | B25J 9/104 294/104 |

(Continued)

FOREIGN PATENT DOCUMENTS

EP 1081026 A2 * 3/2001 .......... B25J 19/0091
JP 4234547 12/2008

*Primary Examiner* — Gabriela M Puig
(74) *Attorney, Agent, or Firm* — Rankin, Hill & Clark LLP (57) ABSTRACT

A hand device includes: a hand base (40*a*); a first finger (40*b*) which extends from a tip of the hand base (40*a*) in a longitudinal direction while bending to the hand base (40*a*); a second finger (40*c*) attached to the hand base (40*a*) so as to face a surface of the hand base (40*a*) side of a tip of the first finger (40*b*); and a drive mechanism (40*e*) which actuates the second finger (40*c*) so that a tip of the second finger (40*c*) approaches or separates from the first finger (40*b*).

11 Claims, 8 Drawing Sheets

(56) References Cited

U.S. PATENT DOCUMENTS

| | | | | |
|---|---|---|---|---|
| 8,052,761 B2* | 11/2011 | Veatch | .................... | A61F 2/588 |
| | | | | 623/64 |
| 2001/0001525 A1* | 5/2001 | Shepard | .................. | B66C 1/625 |
| | | | | 294/81.61 |
| 2004/0186626 A1* | 9/2004 | Tsukamoto | .......... | B25J 15/0023 |
| | | | | 700/258 |
| 2005/0151386 A1* | 7/2005 | McIntosh | ................. | B25J 9/144 |
| | | | | 294/197 |
| 2009/0067973 A1* | 3/2009 | Eliuk | ....................... | B66C 1/42 |
| | | | | 414/729 |
| 2012/0091743 A1* | 4/2012 | Ohman, III | ............... | B66C 1/44 |
| | | | | 294/104 |
| 2016/0185405 A1* | 6/2016 | Takanishi | ............. | B62D 57/032 |
| | | | | 180/8.3 |

* cited by examiner

HAND DEVICE, ROBOT ARM, AND ROBOT

BACKGROUND OF THE INVENTION

Field of the Invention

The present invention relates to a hand device, a robot arm, and a robot which perform work, such as a pushing operation, a pulling operation, a gripping operation, and a pinching operation.

Description of the Related Art

Conventionally, as a hand device for performing work, such as a pushing operation, a pulling operation, a gripping operation, and a pinching operation, there has been known a hand device comprising: a hand base; and a plurality of fingers each coupled to the hand base and each having a bending and stretching mechanism (for example, refer to Japanese Patent No. 4234547).

In the hand device configured as described above, each finger bends and stretches independently according to operation of a robot arm or a robot using the hand device, and becomes a mode suitable for the operation.

However, when a pushing operation and a pulling operation are performed using the hand device described in Japanese Patent No. 4234547, a load is applied to an object through the fingers. At this time, a large force might be applied to the fingers to thereby cause breakage in the bending and stretching mechanisms of the fingers.

In addition, although it is also considered that the number of bending and stretching mechanisms of the fingers is reduced in order to prevent such breakage, degrees of freedom of the fingers are lowered when the number of bending and stretching mechanisms is reduced. Therefore, it might be difficult to perform operations (for example, a gripping operation, a pinching operation, and an operation of pushing a button) requiring a precise motion other than the pushing operation and the pulling operation.

The present invention has been made in view of the above problem, and an object thereof is to provide a hand device, and a robot arm and a robot using the hand device which are not easily broken and can perform operation requiring a precise motion.

SUMMARY OF THE INVENTION

In order to achieve the above-described object, a hand device of the present invention comprises: a hand base; a first finger which extends from a front end portion of the hand base; a second finger which is located behind the first finger and is attached to the hand base so as to face the first finger; and a drive mechanism which actuates the second finger so that a tip portion of the second finger approaches or separates from the first finger, or approaches and separates from the first finger.

In the hand device of the present invention, the first finger applies a load to an object through a surface located in a longitudinal direction of the hand base and on an opposite side of the hand base in a case of a pushing operation, and applies a load to the object through a surface located on the hand base side in a case of a pulling operation.

When a large load is applied to the object in the case of such operations, breakage might occur in a joint mechanism between the hand base and the first finger in a conventional hand device. However, the first finger of the hand device of the present invention is fixed to the hand base, i.e., it is not coupled to the hand base through the joint mechanism as in the conventional hand device.

Therefore, according to the hand device of the present invention, even if the large load is applied to the object in the case of the above-described operations, breakage does not easily occur.

In addition, according to the hand device of the present invention, an operation requiring a precise motion, such as an operation of pinching the object by the second finger and the first finger can also be easily performed.

In addition, in the hand device of the present invention, the tip portion of the second finger is preferably located at a position closer to the hand base than a tip portion of the first finger in a closed state where the tip portion of the second finger is made to approach the first finger.

If the hand device is configured as described above, a size of the whole hand device in the closed state (for example, a state of pinching the object when the hand device performs a pinching operation) can be more reduced. As a result, work can be performed even in a narrow place.

In addition, in the hand device of the present invention, the drive mechanism preferably maintains the closed state where the tip portion of the second finger is made to approach the first finger at a time of non-drive.

If the hand device is configured as described above, the hand device does not drop the object even if supply of a drive force stops during operation. In addition, since it becomes unnecessary to continue to supply the drive force in the closed state (for example, the state of pinching the object when the hand device performs the pinching operation), power saving can be achieved, and reduction in size and weight of a drive source used for the drive mechanism can be achieved.

In addition, in the hand device of the present invention, the drive mechanism preferably rotates the second finger so that the tip portion of the second finger approaches or separates from the first finger, or approaches and separates from the first finger.

If the hand device is configured as described above, the object can be gripped by three-point contact using the first finger, the second finger, and the hand base. In addition, the hand device can perform an operation in which the tip portion of the second finger is moved to a position which projects more than the tip of the first finger, and in which a button or the like is pushed by the tip portion of the second finger. Therefore, types of operations executable by the hand device can be increased.

In addition, in the hand device of the present invention, the first finger is formed to be longer than the second finger in a direction perpendicular to the longitudinal direction of the hand base and to a direction in which the first finger extends. Additionally, the first finger preferably has a projection at a position which faces the tip portion of the second finger, the projection projecting in a direction separating from the hand base.

If such a projection is provided, the operation of pushing the button or the like can be performed even by the tip of the first finger.

In addition, in the hand device of the present invention, when the projection is provided at the first finger, the second finger has a nail which abuts the projection in the closed state where the tip portion of the second finger is made to approach the first finger, and a length of the nail in the direction perpendicular to the longitudinal direction of the hand base and to the direction in which the first finger extends preferably corresponds to a length of the projection of the first finger.

The lengths of the projection of the first finger and the nail of the second finger in the direction perpendicular to the longitudinal direction of the hand base and to the direction in which the first finger extends are shorter than a length of the whole first finger. According to such a projection and a nail, a small object hard to be pinched by the first finger and the second finger can also be easily pinched.

In addition, in the hand device of the present invention, the first finger preferably has a buffer member on an opposite side of the second finger side.

If the hand device is configured so that the first finger has such a buffer member, it becomes easier to prevent breakage since the first finger can be protected in the case of the pushing operation.

In addition, in the hand device of the present invention, the drive mechanism has: a drive source which generates a drive force to actuate the second finger; and a brake provided between the drive source and the second finger, the drive source generates the drive force in making an opened state where the tip portion of the second finger is separated from the first finger, and the brake preferably enables the second finger to be actuated at a time of drive, and stops the actuation of the second finger at a time of non-drive.

If the hand device is configured as described above, a position of the second finger can be fixed in a state where the drive source and the brake are not actuated, and thus the hand device can continue to firmly grasp the object even if rated torque of the drive source is reduced. Eventually, since a small drive source can be employed, reduction in weight and size of the whole drive mechanism can be achieved.

In addition, in order to achieve the above-described object, an robot arm of the present invention includes: a hand device; a movable link; and a joint mechanism which couples the movable link to the hand device, in which the hand device comprises: a hand base; a first finger which extends from a front end portion of the hand base; a second finger which is located behind the first finger and is attached to the hand base so as to face the first finger; and a drive mechanism which actuates the second finger so that a tip portion of the second finger approaches or separates from the first finger, or approaches and separates from the first finger, and in which the joint mechanism couples the hand base of the hand device to the movable link rotatably on an opposite side of a side on which the first finger is extended.

According to the robot arm of the present invention, since the robot arm comprises the hand device similar to the above-described one as the hand device, breakage of the hand device coupled to the movable link does not easily occur, and the robot arm can perform operation requiring a precise motion.

In addition, according to the robot arm of the present invention, since the robot arm can perform an operation of raising the hand device (an operation corresponding to an operation in which a human directs his palm to the front), it can perform an operation of pinching an object located on the front in a longitudinal direction of the movable link in addition to various operations which can be performed by the above-described hand device. Further, when the movable link has a function to rotate around an axis in the longitudinal direction, the robot arm can perform an operation of twisting the object located on the front while pinching it.

In addition, in order to achieve the above-described object, a robot of the present invention comprises: a base body; a plurality of movable links; a plurality of joint mechanisms which rotatably couple each of the movable links to the base body; and a hand device coupled to at least one of the plurality of movable links, in which the hand device comprises: a hand base; a first finger which extends from a front end portion of the hand base; a second finger which is located behind the first finger and is attached to the hand base so as to face the first finger; and a drive mechanism which actuates the second finger so that a tip portion of the second finger approaches or separates from the first finger, or approaches and separates from the first finger.

According to the robot of the present invention comprising the above-described hand device, since the robot comprises the hand device similar to the above-described one as the hand device, breakage of the hand device coupled to the movable link does not easily occur, and the robot can perform operation requiring a precise motion.

In addition, according to the robot of the present invention, even when a load is applied to an object so that a self-weight of the robot is supported by the hand device, breakage does not occur in the hand device, and thus the robot can perform movement such as going up a ladder by operation of the hand device and rotation of the movable link.

In addition, the robot of the present invention may be configured so that the plurality of movable links each include: a pair of right and left arm links provided at upper parts of the base body; and a pair of right and left leg links provided at lower parts of the base body, and so that the robot is switchable between a bipedal walking mode only by the leg links or the arm links and a quadrupedal walking mode by the leg links and the arm links.

Since breakage does not occur in the above-described hand device due to the self-weight of the robot even if the hand device is used as a foot flat part of a tip of a leg body of the robot, the arm links which usually perform operation for various works can be used for walking.

In addition, in the robot of the present invention, each of the movable links has a drive part which rotates the hand device with respect to the movable link, and the drive part is preferably located on the base body side of the movable link at a time of a reference posture in which the movable link is not rotated.

Since a combination of a drive source such as an actuator, and a reducer, etc. is generally used as the drive part, the drive part is relatively large in size as a member included in the movable link, and comes into contact with an external environment at the time of movement of the robot, etc. in many cases. Consequently, as described above, if the robot is configured so that the drive part is located on the base body side of the movable link at the time of the reference posture, it becomes easy to avoid contact of the drive part with the external environment.

BRIEF DESCRIPTION OF THE DRAWINGS

FIGS. 6A and 6B are side views each showing parts of the hand part and the arm link of the robot of FIG. 1 as a cross section, FIG. 6A shows a closed state, and FIG. 6B shows an opened state;

DETAILED DESCRIPTION OF THE PREFERRED EMBODIMENT

Hereinafter, an embodiment of a robot according to the present invention will be explained with reference to drawings. A robot 1 of the embodiment is a humanoid, and is configured to be able to move while switching between a bipedal walking mode and a quadrupedal walking mode.

However, a hand device in the present invention is not be applied only to the humanoid configured as described above, but robots each having a mode different from the robot 1 of the embodiment are also included if they are robots each comprising a hand device, such as other industrial robots.

Figure 1:
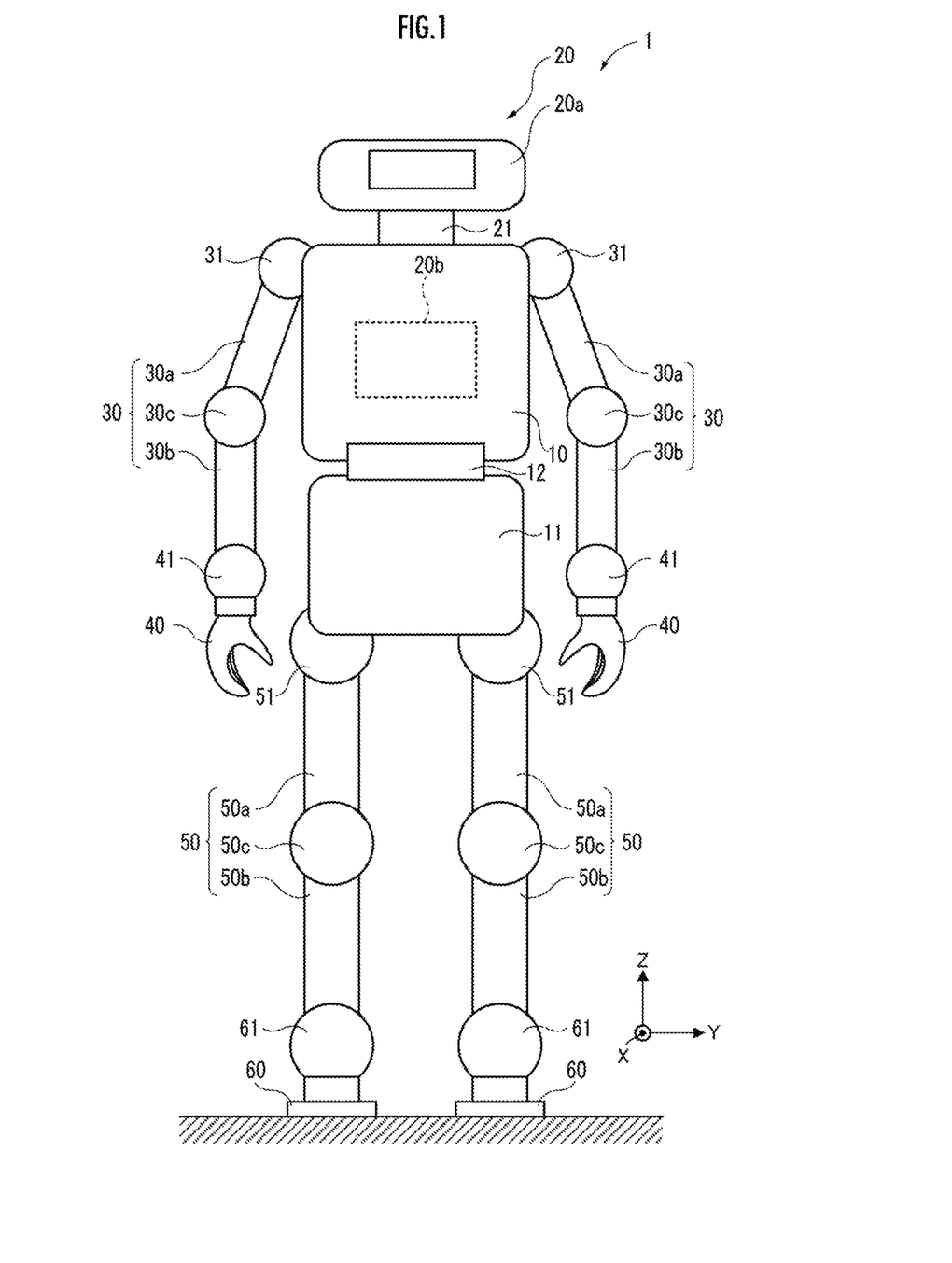
FIG. 1 is a front view schematically showing a configuration of a robot according to an embodiment of the present invention.

First, a configuration of the robot 1 of the embodiment will be explained with reference to FIG. 1.

A body of the robot 1 includes: an upper base body 10; a lower base body 11 arranged below the upper base body 10; and a waist joint mechanism 12 provided between the upper base body 10 and the lower base body 11. The upper base body 10 and the lower base body 11 are relatively rotatably coupled to each other through the waist joint mechanism 12 corresponding to a human waist joint.

A head of the robot 1 is an environment recognition unit 20a of an environment recognition device 20 for recognizing a surrounding environment. The environment recognition unit 20a is rotatably coupled to the upper base body 10 through a neck joint mechanism 21 corresponding to a human neck joint.

A sensor for recognizing a camera for imaging an external environment and a distance to the external environment is mounted in the environment recognition unit 20a. The camera and the sensor are controlled by an environment recognition unit control circuit 20b arranged inside the upper base body 10.

Note that since the robot 1 of the embodiment is the humanoid, the environment recognition unit 20a corresponding to a human head is provided above the upper base body 10. However, the environment recognition unit of the robot of the present invention is not limited to such a configuration, and it may be provided at a position other than an upper part of the upper base body (for example, the front of the upper base body) according to a usage environment of the robot, etc.

Right and left arm bodies of the robot 1 are a pair of arm links 30 (movable links) extended from upper right and left sides of the upper base body 10. Each arm link 30 is rotatably coupled to the upper base body 10 through a shoulder joint mechanism 31 corresponding to a human shoulder joint.

The arm link 30 includes: a first arm link part 30a corresponding to a human upper arm; a second arm link part 30b corresponding to a human forearm; and an elbow joint mechanism 30c corresponding to a human elbow joint.

The first arm link part 30a is rotatably coupled to the upper base body 10 through the shoulder joint mechanism 31. The second arm link part 30b is rotatably coupled to the first arm link part 30a through the elbow joint mechanism 30c. A hand part 40 (a hand device) corresponding to a human hand is coupled to a tip of the second arm link part 30b.

Note that in the robot 1 of the embodiment, the arm link 30 as the arm body includes: the first arm link part 30a; the second arm link part 30b; and the elbow joint mechanism 30c. However, the arm body of the robot of the present invention is not limited to such a configuration, and it may have a single link part, or may have three or more link parts, and a plurality of joint parts which couple the each link part.

The hand part 40 is one example of an end effector. The hand part 40 is rotatably coupled to the second arm link part 30b of the arm link 30 through a wrist joint mechanism 41 corresponding to a human wrist joint. In the robot 1 of the embodiment, the hand part 40 and the arm link 30 are included in a robot arm as a manipulator.

Right and left leg bodies of the robot 1 are a pair of right and left leg links 50 (movable links) extended downwardly from a lower part of the lower base body 11. Each leg link 50 is rotatably coupled to the lower base body 11 through a hip joint mechanism 51 corresponding to a human hip joint.

The leg link 50 includes: a first leg link part 50a corresponding to a human thigh; a second leg link part 50b corresponding to a human lower thigh; and a knee joint mechanism 50c corresponding to a human knee joint.

The first leg link part 50a is rotatably coupled to the lower base body 11 through the hip joint mechanism 51. The second leg link part 50b is rotatably coupled to the first leg link part 50a through the knee joint mechanism 50c. A foot flat part 60 corresponding to a human foot is coupled to a tip of the second leg link part 50b.

Note that in the robot 1 of the embodiment, the leg link 50 as the leg body includes: the first leg link part 50a; the second leg link part 50b; and the knee joint mechanism 50c. However, the leg body of the robot of the present invention is not limited to such a configuration, and it may have a single link part, or may have three or more link parts, and a plurality of joint parts which couple the each link part.

The foot flat part 60 is rotatably coupled to the second leg link part 50b of the leg link 50 through an ankle joint mechanism 61 corresponding to a human ankle joint.

Next, degrees of freedom of joint mechanisms of the robot 1 of the embodiment will be explained with reference to FIG. 2.

Note that in explanation of the embodiment, a direction in which each joint mechanism rotates each member will be explained on the basis of an attitude in which no joint mechanism rotates the member coupled thereto (hereinafter referred to as a "reference posture"), unless otherwise noted. In a case of the robot 1 of the embodiment, the reference posture is a state where the robot 1 stands (a state where the upper base body 10, the lower base body 11, each arm link 30, and each leg link 50 are extended substantially in a vertical direction).

Figure 2:
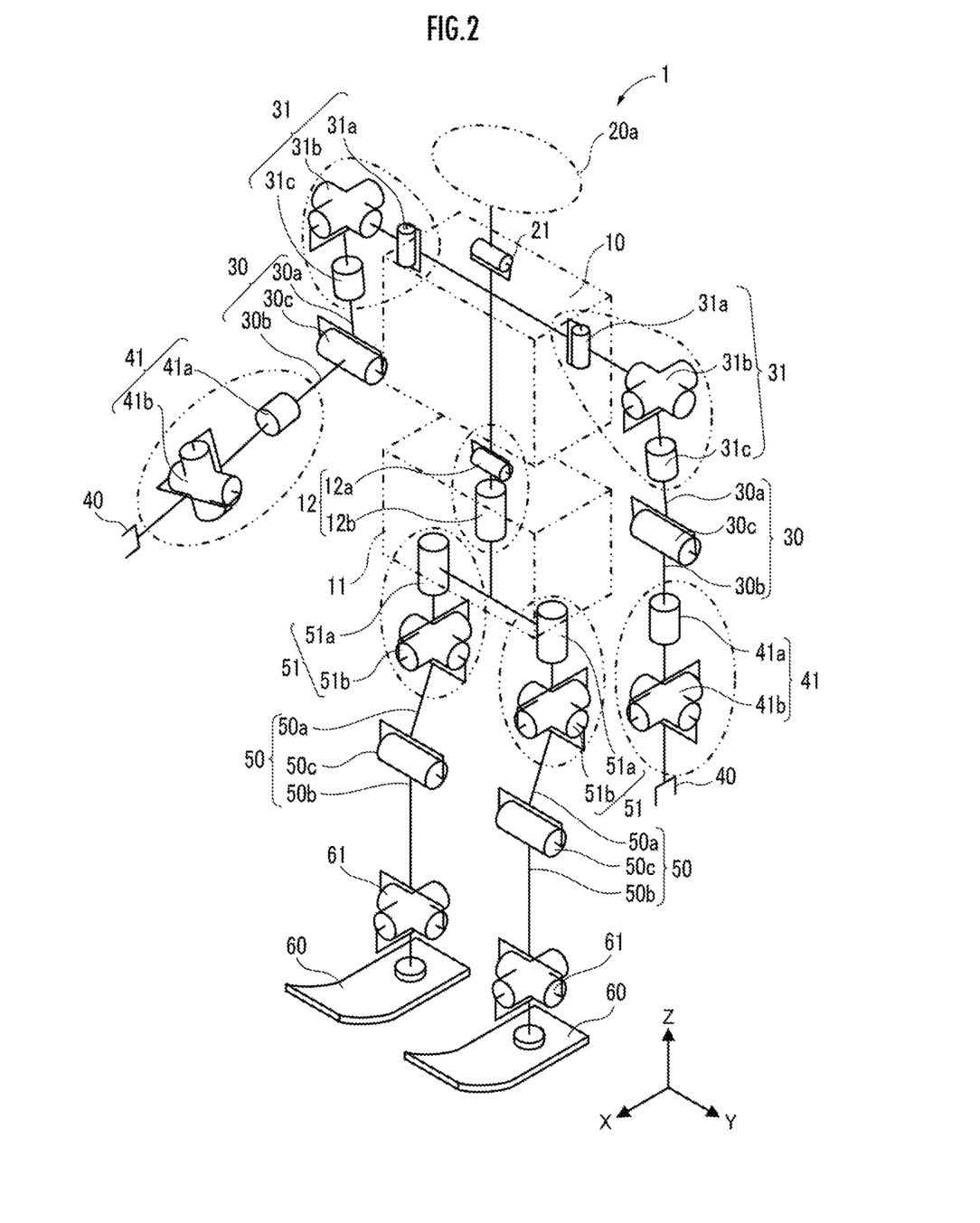
FIG. 2 is a perspective view schematically showing degrees of freedom of joint mechanisms of the robot of FIG. 1.

In addition, in the explanation of the embodiment, a yaw axis, a pitch axis, and a roll axis denote an axis in the vertical direction (a Z-axis), an axis in a right and left direction (a Y-axis), and an axis in a front and rear direction (an X-axis) in a case of the reference posture of the robot 1 as shown in FIG. 2, respectively. In this case, the yaw axis is a trunk axis of the upper base body 10 and the lower base body 11.

The waist joint mechanism 12 includes: a first waist joint mechanism 12a arranged below the upper base body 10; and a second waist joint mechanism 12b arranged between the first waist joint mechanism 12a and the lower base body 11.

The first waist joint mechanism 12a rotatably couples the upper base body 10 with the lower base body 11 and the second waist joint mechanism 12b around the pitch axis. The second waist joint mechanism 12b rotatably couples the upper base body 10 and the first waist joint mechanism 12a with the lower base body 11 around the yaw axis.

The neck joint mechanism 21 rotatably couples the environment recognition unit 20a with the upper base body 10 around the pitch axis.

The elbow joint mechanism 30c of the arm link 30 rotatably couples the second arm link part 30b corresponding to the human forearm to the first arm link part 30a corresponding to the human upper arm around the pitch axis.

The shoulder joint mechanism 31 includes: a first shoulder joint mechanism 31a arranged so as to be located within a range of widths of the upper base body 10 in the vertical direction and a horizontal direction; a second shoulder joint mechanism 31b arranged on a side of the first shoulder joint mechanism 31a and outside the upper base body 10; and a third shoulder joint mechanism 31c arranged between the second shoulder joint mechanism 31b and the first arm link part 30a of the arm link 30.

Here, the "width" of the base body in the vertical direction indicates an interval from the highest position to the lowest position of the base body in a state where the robot is usually used. Similarly, the "width" of the base body in the horizontal direction indicates an interval from the forwardmost position to the rearmost position of the base body, or an interval from the rightmost position to the leftmost position of the base body in the state where the robot is usually used.

The first shoulder joint mechanism 31a rotatably couples the second shoulder joint mechanism 31b with the upper base body 10 around the yaw axis. The second shoulder joint mechanism 31b rotatably couples the third shoulder joint mechanism 31c with the first shoulder joint mechanism 31a around the pitch axis and the roll axis. The third shoulder joint mechanism 31c rotatably couples the arm link 30 with the second shoulder joint mechanism 31b around the yaw axis.

The wrist joint mechanism 41 includes: a first wrist joint mechanism 41a arranged at the hand part 40 side of the second arm link part 30b of the arm link 30; and a second wrist joint mechanism 41b arranged between the first wrist joint mechanism 41a and the hand part 40.

The first wrist joint mechanism 41a rotatably couples the second wrist joint mechanism 41b with the second arm link part 30b around the yaw axis. The second wrist joint mechanism 41b rotatably couples the hand part 40 with the first wrist joint mechanism 41a around the roll axis and the pitch axis.

The knee joint mechanism 50c of the leg link 50 rotatably couples the second leg link part 50b corresponding to a human lower limb with the first leg link part 50a corresponding to the human thigh around the pitch axis.

The hip joint mechanism 51 includes: a first hip joint mechanism 51a arranged below the lower base body 11; and a second hip joint mechanism 51b arranged on the leg link 50 side of the first hip joint mechanism 51a.

The first hip joint mechanism 51a rotatably couples the second hip joint mechanism 51b with the lower base body 11 around the yaw axis. The second hip joint mechanism 51b rotatably couples the leg link 50 with the first hip joint mechanism 51a around the pitch axis and the roll axis.

The ankle joint mechanism 61 rotatably couples the foot flat part 60 with the second leg link part 50b around pitch axis and the roll axis.

Note that configurations of a waist joint mechanism, a neck joint mechanism, a shoulder joint mechanism, an elbow joint mechanism, a knee joint mechanism, a hip joint mechanism, and an ankle joint mechanism in the robot of the present invention are not limited to the above-described configurations, and that they may be appropriately changed according to applications of the robot or arrangement spaces of joints in the robot. For example, any of the joint mechanisms may be omitted, or a joint mechanism other than the above-described joint mechanisms may be added.

Next, two walking modes of the robot 1 of the embodiment will be explained with reference to FIGS. 3 and 4. Note that illustration of the arm link 30 is omitted in FIG. 3 in order to facilitate understanding.

Note that in the explanation of the embodiment, "bringing the hand part 40 or the foot flat part 60 into contact with the ground" means that the hand part 40 or the foot flat part 60 is brought into contact with the external environment so as to receive a contact reaction force which resists a force acting on the robot 1.

Figure 3:
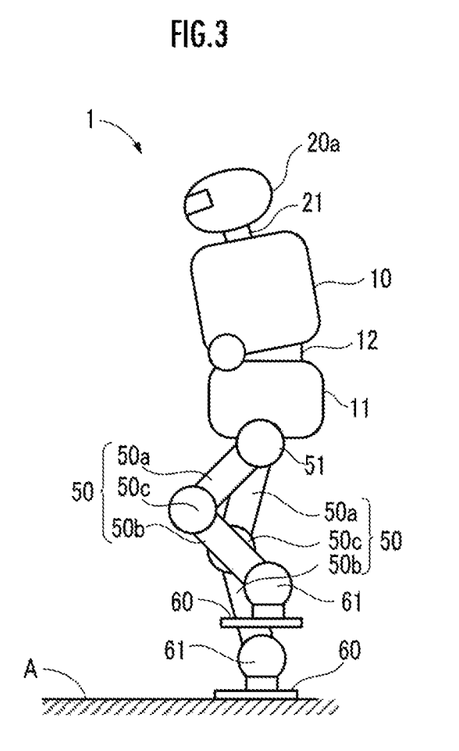
FIG. 3 is a side view showing a state where the robot of FIG. 1 is moving in a bipedal walking mode.

As shown in FIG. 3, in the bipedal walking mode, in a state where the foot flat part 60 of a tip of one of the pair of leg links 50 is brought into contact with the ground A (a state where the one leg link 50 is used as a support leg), such operation is repeated that the foot flat part 60 of a tip of the other leg link 50 is moved in the air, and is further brought into contact with the ground A (the other leg link 50 is made to operate as a swing leg). In this case, operation of the respective leg links 50 as the swing legs are alternately performed. In addition, the arm links 30, whose illustration is omitted, each are in a non-contact state with the ground A.

Figure 4:
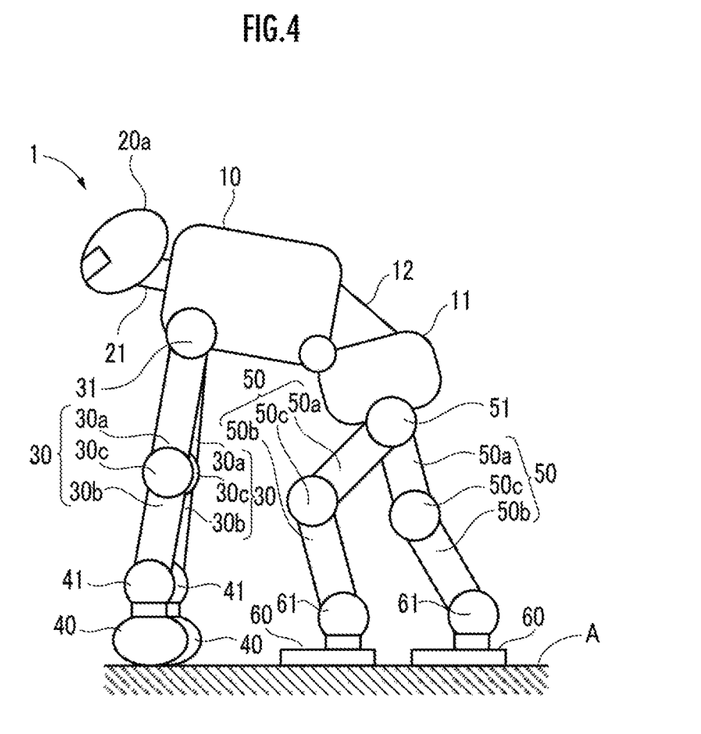
FIG. 4 is a side view showing a state where the robot of FIG. 1 is moving in a quadrupedal walking mode.

As shown in FIG. 4, in the quadrupedal walking mode, in a state where two or three of the hand parts 40 of the tips of the arm links 30 and the foot flat parts 60 of the tips of the leg links 50 are brought into contact with the ground A (a state where the two or three of the arm links 30 and the leg links 50 are used as the support legs), such operation is repeated that the remaining two or one hand part(s) 40 or foot flat part(s) 60 are (is) moved in the air, and are (is) further brought into contact with the ground A (the remaining two or one arm link(s) 30 or leg link(s) 50 are (is) made to operate as the swing leg(s)). In this case, the arm link 30 or the leg link 50 made to operate as the swing leg is periodically switched by a predetermined rule.

However, operation of the quadrupedal walking mode is not limited to the above-described operation. For example, in a state where one of the hand parts 40 of the tips of the arm links 30 and the foot flat parts 60 of the tips of the leg links 50 is brought into contact with the ground A (a state where the one hand part 40 or foot flat part 60 is used as the support leg), it is also possible to repeat such operation that the remaining three hand parts 40 and foot flat part 60 are moved in the air, and are further brought into contact with the ground A (the remaining three hand parts 40 and foot flat part 60 are made to operate as the swing legs).

In addition, it is also possible to repeat such operation that the hand parts 40 of the tips of the arm links 30 and the foot flat parts 60 of the tips of the leg links 50 are moved in the air all at once (i.e., the robot 1 is made to jump), and are further brought into contact with the ground A.

Figure 5:
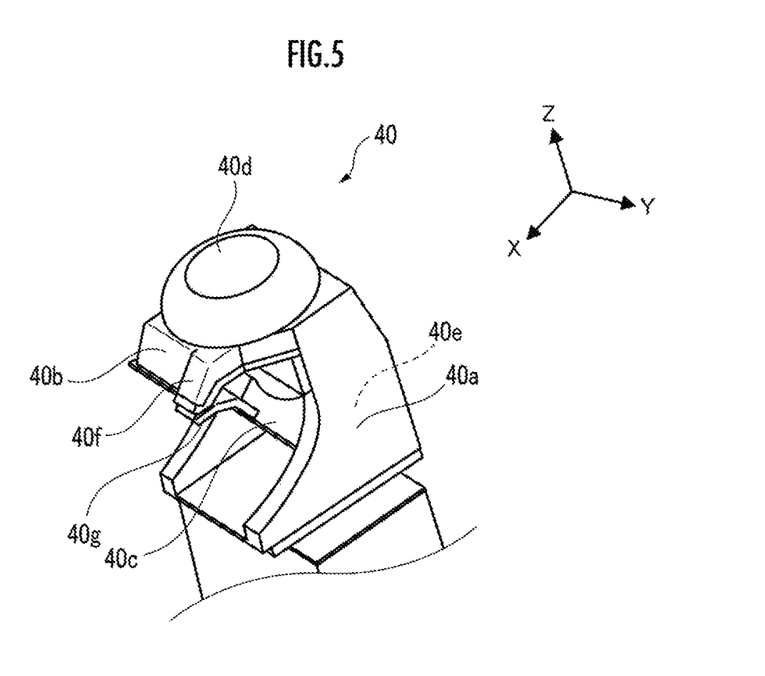
FIG. 5 is a perspective view showing parts of a hand part and an arm link of the robot of FIG. 1.
Figure 6A:
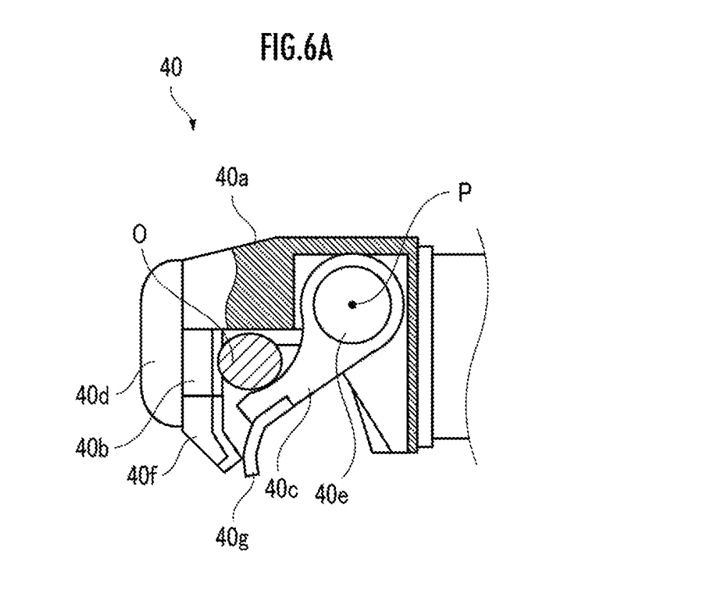
Figure 6B:
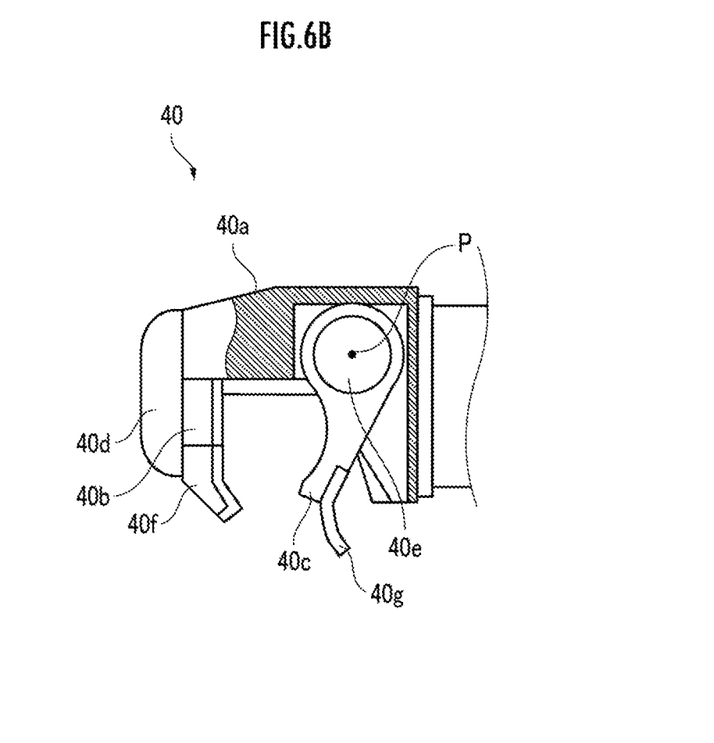

Hereinafter, the hand part 40 of the embodiment will be explained in detail with reference to FIGS. 5, 6A, and 6B. Note that the hand part 40 in FIGS. 5, 6A, and 6B is located on a right side of the robot 1 at the time of the reference posture, and is included in a right hand.

First, a configuration of the hand part 40 will be explained in detail with reference to FIG. 5.

The hand part 40 includes: a hand base 40a corresponding to a palm and a back of a human hand; a first finger 40b which is a single member corresponding to a human index finger, middle finger, third finger, and little finger; and a second finger 40c corresponding to a human thumb.

The first finger 40b extends from a tip portion of the hand base 40a in a longitudinal direction while bending to the hand base 40*a*. The first finger 40*b* is configured integrally with the hand base 40*a*, and is fixed to the hand base 40*a*. A buffer member 40*d* is attached to a surface of an opposite side of the hand base 40*a* of the first finger 40*b*.

In the hand part 40 comprising the first finger 40*b* configured as described above, the first finger 40*b* applies a load to an object through a surface located on the opposite side of the hand base 40*a* (i.e., the buffer member 40*d*) in a case of a pushing operation. Meanwhile, the first finger 40*b* applies a load to the object through a surface of the hand base 40*a* side of the first finger 40*b* in a case of a pulling operation.

Since a joint mechanism is provided between a hand base and a first finger in a conventional robot, a large force might be applied to the first finger to thereby cause breakage in the joint mechanism in the cases of the above-described pushing operation and pulling operation. However, the first finger 40*b* of the hand part 40 of the robot 1 of the embodiment is fixed to the hand base 40*a*, i.e., it is not coupled to the hand base through the joint mechanism as in the conventional robot.

Therefore, even if a large load is applied to the object in the cases of the above-described operations, breakage does not easily occur in the hand part 40.

In addition, since the buffer member 40*d* protects the first finger 40*b* in the case of the pushing operation, breakage does not easily occur in the first finger 40*b* itself, either.

In addition, in the robot 1 comprising the hand part 40 configured as described above, even when the object is held so that a self-weight of the robot 1 is supported by the hand part 40, breakage does not occur in the hand part 40. As a result, the robot 1 can perform movement such as going up a ladder by operation of the hand part 40 and rotation of the arm link 30.

Further, even when the robot 1 comprising the hand part 40 configured as described above moves in the quadrupedal walking mode in which the robot 1 moves while bringing the first finger 40*b* (the buffer member 40*d* attached to the opposite side of the hand base 40*a* of the first finger 40*b* in the embodiment) of the hand part 40 into contact with the ground, breakage does not occur in the hand part 40 due to the self-weight of the robot 1.

The second finger 40*c* is attached to the hand base 40*a* so as to face a surface of the hand base 40*a* side of a tip portion of the first finger 40*b*. The second finger 40*c* is rotated by a drive mechanism 40*e* (refer to FIGS. 6A and 6B) provided inside the hand base 40*a* so that a tip portion of the second finger 40*c* approaches and separates from the first finger 40*b*.

Since the second finger 40*c* is configured as described above, the hand part 40 can also easily perform an operation requiring a precise motion, such as an operation of pinching the object by the first finger 40*b* and the second finger 40*c*.

In addition, the first finger 40*b* is formed to be longer than the second finger 40*c* in a direction (a Y-axis direction) perpendicular to the longitudinal direction of the hand base 40*a* and to a direction in which the first finger 40*b* extends. Additionally, the first finger 40*b* has a projection 40*f* at a position which faces the tip portion of the second finger 40*c*, the projection 40*f* projecting in a direction (an X-axis direction) separating from the hand base 40*a*.

By having such a projection 40*f*, the hand part 40 can perform an operation of pushing a button or the like even with the tip portion of the first finger 40*b*.

In addition, the second finger 40*c* has a nail 40*g* which abuts against the projection 40*f* in a state (hereinafter referred to as a "closed state") where the tip portion of the second finger 40*c* is made to approach the first finger 40*b*.

A length of the nail 40*g* in the direction (the Y-axis direction) perpendicular to the longitudinal direction of the hand base 40*a* and to the direction in which the first finger 40*b* extends corresponds to a length of the projection 40*f* of the first finger 40*b*.

By having such a nail 40*g*, the hand part 40 can easily pinch even a small object hard to be pinched by the first finger 40*b* and the second finger 40*c* by the projection 40*f* and the nail 40*g*. In addition, it also becomes possible to perform an operation of pushing a small button hard to be pushed by the projection 40*f* by utilizing the nail 40*g*.

Next, rotation of the second finger 40*c* of the hand part 40 will be explained with reference to FIGS. 6A and 6B.

The drive mechanism 40*e* rotates the second finger 40*c* around a fulcrum P located inside the hand base 40*a* so that the tip portion of the second finger 40*c* approaches and separates from the first finger 40*b*.

Since the second finger 40*c* rotates as described above, as shown in FIG. 6A, in the closed state, the hand part 40 can grip an object O by three-point contact using the surface of the hand base 40*a* side of the first finger 40*b*, a surface of the hand base 40*a* side of the second finger 40*c*, and a surface of a side on which the first finger 40*b* of the hand base 40*a* extends.

In addition, since the tip portion of the second finger 40*c* is located at a position closer to the hand base 40*a* than the tip portion of the first finger 40*b* in the closed state, the whole hand part 40 is more reduced in size in the closed state. Therefore, when the robot 1 performs work in a narrow place, the hand part 40 as an end effector can be easily moved to a working area by setting it to be the closed state. As a result, contact of the hand part 40 with the external environment can be prevented, and breakage of the hand part 40 can be prevented.

Meanwhile, as shown in FIG. 6B, since the second finger 40*c* is located at a position which projects more than the first finger 40*b* in a state (hereinafter referred to as an "opened state") where the tip portion of the second finger 40*c* is separated from the tip portion of the first finger 40*b*, the hand part 40 can perform an operation of pushing a button or the like with the tip portion of the second finger 40*c* (the nail 40*g* in the embodiment).

Figure 7:
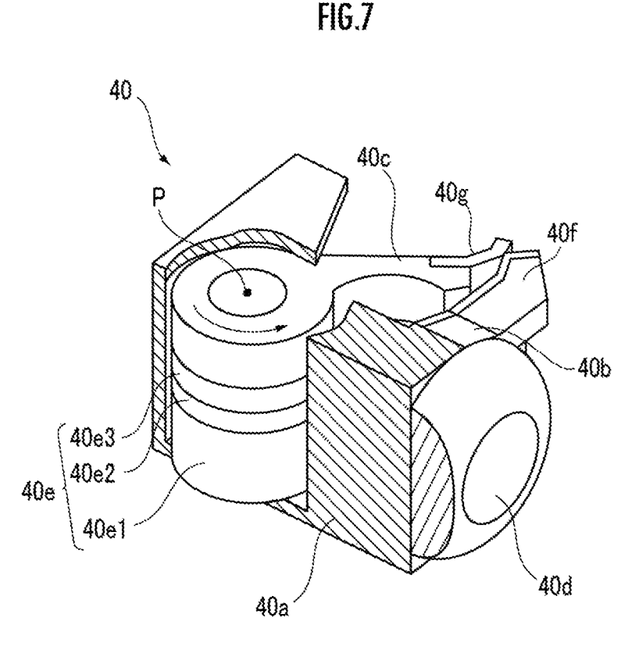
FIG. 7 is a perspective view showing an internal structure of the hand part of the robot of FIG. 1 as a cross section.

Next, the drive mechanism 40*e* incorporated in the hand part 40 will be explained with reference to FIG. 7.

The drive mechanism 40*e* includes: a drive source 40*e*1; an electromagnetic brake 40*e*2 which controls transmission of a drive force from the drive source 40*e*1; and a reducer 40*e*3 which decelerates the drive force from the drive source 40*e*1 transmitted through the electromagnetic brake 40*e*2, and transmits it to the second finger 40*c*. In addition, the drive mechanism 40*e* is configured so that the second finger 40*c* becomes the opened state at the time of drive, and becomes the closed state at the time of non-drive.

Since the hand part 40 comprises the drive mechanism 40*e* configured as described above, a state where the hand part 40 grips the object is not released, and the hand part 40 does not fall the object, even if supply of the drive force stops during the operation of the hand part 40. In addition, when the robot 1 is going up the ladder, fall of the robot 1 is prevented.

By the way, in the conventional robot, drive of fingers is controlled only by an output mainly from a drive source, and an operation of grasping an object is performed.

In addition, although the drive source, such as a motor used in the conventional robot can generally instantly generate large torque (hereinafter the maximum torque is referred to as "instant maximum torque"), rated torque (holding torque) has a feature of becoming lower than the instant maximum torque.

Therefore, in order to perform the operation of continuing to grasp the object by a hand part of the conventional robot, a motor having sufficiently large rated torque (holding torque) (i.e., a motor having a large size) must be used, which leads to increase in size of the whole hand part.

In contrast with this, the hand part 40 of the robot 1 of the embodiment has a configuration in which the drive mechanism 40e has the electromagnetic brake 40e2 between the second finger 40c and the drive source 40e1 which generates a drive force to rotate the second finger 40c. The electromagnetic brake 40e2 is configured to enable actuation of the second finger 40c at the time of drive (at the time of energization), and to stop the actuation of the second finger 40c at the time of non-drive.

When the operation of continuing to grasp the object by the hand part 40 is performed, first, the electromagnetic brake 40e2 is energized to make a drive force from the drive source 40e1 transmittable to the second finger 40c, next, the second finger 40c is rotated by an instant maximum torque generated in the drive source 40e1 to then grasp the object (the second finger 40c is set to be the closed state after being set to be the opened state), subsequently, energization of the electromagnetic brake 40e2 is cut off, and the second finger 40c is fixed.

Namely, the hand part 40 can hold a state of grasping the object in a state where the drive force generated in the drive source 40e1 is zero (the same state as the drive source 40e1 continuing to generate the rated torque).

Therefore, the drive source 40e1 used for the hand part 40 may just be able to generate instant maximum torque large enough to rotate the second finger 40c when the hand part 40 grasps the object, and a drive source smaller than that of the conventional robot can be employed. As a result, the drive mechanism 40e can be more reduced in size and weight than a conventional drive mechanism as a whole even if it comprises the electromagnetic brake 40e2.

Figure 8:
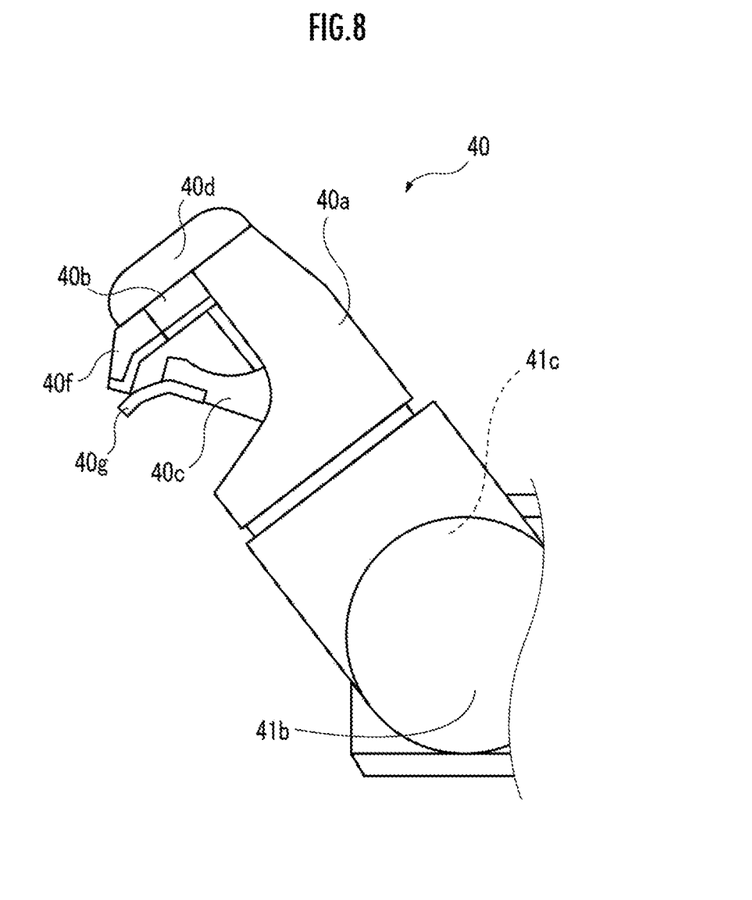
FIG. 8 is a side view showing a state where the hand part of the robot of FIG. 1 bends to the arm link.

Hereinafter, the wrist joint mechanism 41 of the embodiment will be explained in detail with reference to FIG. 8. Note that the wrist joint mechanism 41 in FIG. 8 is located on the right side of the robot 1 at the time of the reference posture.

The second wrist joint mechanism 41b of the wrist joint mechanism 41 couples an end portion of the opposite side of the first finger 40b side in the longitudinal direction of the hand base 40a of the hand part 40 to the arm link 30 rotatably around the pitch axis toward a side opposite to a side on which the first finger 40b is extended. Namely, an operation of raising the hand part 40 (an operation corresponding to an operation in which a human directs his palm to the front) can be performed in the robot 1.

Therefore, the hand part 40 can perform an operation of pinching an object located on the front in a longitudinal direction of the arm link 30. Further, since the arm link 30 can rotate around an axis in the longitudinal direction by the third shoulder joint mechanism 31c of the shoulder joint mechanism 31, the hand part 40 can perform an operation of twisting the object located on the front while pinching it.

A drive part 41c for relatively rotating the hand part 40 and the second wrist joint mechanism 41b is arranged inside the second wrist joint mechanism 41b of the wrist joint mechanism 41. Since the drive part 41c is a combination of a drive source such as an actuator, and a reducer, etc., it is relatively large in size as a member included in the wrist joint mechanism 41.

Consequently, the robot 1 is configured so that the drive part 41c is located on the upper base body 10 side of the wrist joint mechanism 41 at the time of the reference posture, and thereby contact of the drive part 41c with the external environment is avoided.

Hereinbefore, although the illustrated embodiment has been explained, the present invention is not limited to such an embodiment.

For example, although in the above-described embodiment, the buffer member 40d is attached to the first finger 40b, a buffer member may be omitted according to a material of a first finger or a self-weight of a robot.

In addition, although in the above-described embodiment, the projection 40f is provided at the first finger 40b, the projection 40f may be omitted according to a width of the first finger 40b, etc.

In addition, although in the above-described embodiment, the nail 40g is provided at the second finger 40c so as to correspond to the projection 40f of the first finger 40b, the nail 40g may be omitted. When the nail 40g is omitted, a pinching operation is performed by the first finger 40b and the second finger 40c. In addition, the nail 40g does not necessarily correspond to the projection 40f, and it may be provided also when the projection 40f is omitted.

In addition, the drive mechanism 40e rotates the second finger 40c in the above-described embodiment. However, the present invention is not limited to the above-described configuration, and a drive mechanism may just actuate a second finger so that a tip portion of the second finger approaches or separates from a first finger, or approaches and separates from the first finger. For example, the drive mechanism may slide the second finger to a hand base.

REFERENCE SIGNS LIST 1 robot
10 upper base body
11 lower base body
12 waist joint mechanism
12a first waist joint mechanism
12b second waist joint mechanism
20 environment recognition device
20a environment recognition unit
20b environment recognition unit control circuit
21 neck joint mechanism
30 arm link (movable link)
30a first arm link part
30b second arm link part
30c elbow joint mechanism
31 shoulder joint mechanism
31a first shoulder joint mechanism
31b second shoulder joint mechanism
31c third shoulder joint mechanism
40 hand part (hand device)
40a hand base
40b first finger
40c second finger
40d buffer member
40e drive mechanism
40e1 drive source
40e2 electromagnetic brake
40e3 reducer
40f projection
40g nail
41 wrist joint mechanism
41a first wrist joint mechanism
41b second wrist joint mechanism 41c drive part
50 leg link (movable link)
50a first leg link part
50b second leg link part
50c knee joint mechanism
51 hip joint mechanism
51a first hip joint mechanism
51b second hip joint mechanism
60 foot flat part
61 ankle joint mechanism
A ground
O object
P fulcrum of rotation of second finger 40c

What is claimed is:

1. A hand device comprising:
a hand base;
a first finger which extends from a front end portion of the hand base and which is fixed to the hand base so as to be immoveable relative to the hand base;
a second finger which is located behind the first finger and is attached to the hand base so as to face the first finger; and
a drive mechanism which actuates the second finger so that a tip portion of the second finger approaches or separates from the first finger, or approaches and separates from the first finger,
wherein
the drive mechanism comprises:
a drive source which generates a drive force to actuate the second finger; and
a brake provided between the drive source and the second finger,
the drive source generates the drive force in making an opened state where the tip portion of the second finger is separated from the first finger, and
the brake enables actuation of the second finger at a time of drive, and stops the actuation of the second finger at a time of non-drive.

2. The hand device according to claim 1, wherein the tip portion of the second finger is located at a position closer to the hand base than a tip portion of the first finger in a closed state where the tip portion of the second finger is made to approach the first finger.

3. The hand device according to claim 1, wherein the drive mechanism maintains a closed state where the tip portion of the second finger is made to approach the first finger at the time of non-drive.

4. The hand device according to claim 1, wherein the drive mechanism rotates the second finger so that the tip portion of the second finger approaches or separates from the first finger, or approaches and separates from the first finger.

5. The hand device according to claim 1, wherein the first finger is formed to be longer than the second finger in a direction perpendicular to a longitudinal direction of the hand base and to a direction in which the first finger extends, and has a projection at a position which faces the tip portion of the second finger, the projection projecting in a direction separating from the hand base.

6. The hand device according to claim 5, wherein
the second finger has a nail which abuts the projection in a closed state where the tip portion of the second finger is made to approach the first finger, and
a length of the nail in the direction perpendicular to the longitudinal direction of the hand base and to the direction in which the first finger extends corresponds to a length of the projection of the first finger.

7. The hand device according to claim 1, wherein the first finger has a buffer member on an opposite side of the second finger side.

8. A robot arm including:
a hand device;
a movable link; and
a joint mechanism which couples the movable link to the hand device, wherein
the hand device comprising:
a hand base;
a first finger which extends from a front end portion of the hand base and which is fixed to the hand base so as to be immoveable relative to the hand base;
a second finger which is located behind the first finger and is attached to the hand base so as to face the first finger; and
a drive mechanism which actuates the second finger so that a tip portion of the second finger approaches or separates from the first finger, or approaches and separates from the first finger,
wherein
the drive mechanism comprises:
a drive source which generates a drive force to actuate the second finger; and
a brake provided between the drive source and the second finger,
the drive source generates the drive force in making an opened state where the tip portion of the second finger is separated from the first finger,
the brake enables actuation of the second finger at a time of drive, and stops the actuation of the second finger at a time of non-drive, and
the joint mechanism couples the hand base of the hand device to the movable link rotatably on an opposite side of a side on which the first finger is extended.

9. A robot including:
a base body;
a plurality of movable links;
a plurality of joint mechanisms which rotatably couple the each movable link to the base body; and
a hand device coupled to at least one of the plurality of movable links, wherein
the hand device comprising:
a hand base;
a first finger which extends from a front end portion of the hand base and which is fixed to the hand base so as to be immoveable relative to the hand base;
a second finger which is located behind the first finger and is attached to the hand base so as to face the first finger; and
a drive mechanism which actuates the second finger so that a tip portion of the second finger approaches or separates from the first finger, or approaches and separates from the first finger,
wherein
the drive mechanism comprises:
a drive source which generates a drive force to actuate the second finger; and
a brake provided between the drive source and the second finger,
the drive source generates the drive force in making an opened state where the tip portion of the second finger is separated from the first finger, and
the brake enables actuation of the second finger at a time of drive, and stops the actuation of the second finger at a time of non-drive.

10. The robot according to claim 9, wherein
the plurality of movable links each include: a pair of right and left arm links provided at upper parts of the base body; and a pair of right and left leg links provided at lower parts of the base body, and
the robot is switchable between a bipedal walking mode only by the leg links or the arm links and a quadrupedal walking mode by the leg links and the arm links.

11. The robot according to claim 9, wherein
each of the movable links has a drive part which rotates the hand device with respect to the movable link, and
the drive part is located on the base body side of the movable link at a time of a reference posture in which the movable link is not rotated.

* * * * *